US011916299B2

(12) United States Patent
Yu

(10) Patent No.: US 11,916,299 B2
(45) Date of Patent: Feb. 27, 2024

(54) ANTENNA APPARATUS

(71) Applicant: JRD Communication (Shenzhen) LTD., Guangdong (CN)

(72) Inventor: Longjie Yu, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 246 days.

(21) Appl. No.: 17/622,839

(22) PCT Filed: Nov. 20, 2019

(86) PCT No.: PCT/CN2019/119614
§ 371 (c)(1),
(2) Date: Dec. 26, 2021

(87) PCT Pub. No.: WO2021/056776
PCT Pub. Date: Apr. 1, 2021

(65) Prior Publication Data

US 2022/0359996 A1 Nov. 10, 2022

(30) Foreign Application Priority Data

Sep. 23, 2019 (CN) ......................... 201910898909.6

(51) Int. Cl.
*H01Q 21/28* (2006.01)
*H01Q 5/20* (2015.01)
*H01Q 1/24* (2006.01)

(52) U.S. Cl.
CPC ............. *H01Q 21/28* (2013.01); *H01Q 1/241* (2013.01); *H01Q 5/20* (2015.01)

(58) Field of Classification Search
CPC .......... H01Q 21/28; H01Q 1/241; H01Q 5/20; H01Q 1/243; H01Q 5/35; H01Q 21/00; H01Q 1/36; H01Q 1/48; H01Q 1/50
See application file for complete search history.

(56) References Cited

U.S. PATENT DOCUMENTS 10,340,592 B2 * 7/2019 Nam ...................... H01Q 1/243
10,741,916 B2 8/2020 Li et al.
(Continued)

FOREIGN PATENT DOCUMENTS

CN 104092016 10/2014
CN 107394358 11/2016
(Continued)

OTHER PUBLICATIONS

Notice of Allowance dated May 12, 2021 From the State Intellectual Property Office of the People's Republic of China Re. Application No. 201910898909.6 and Its Translation of Office Action Into English. (6 Pages).
(Continued)

*Primary Examiner* — Seung H Lee

(57) ABSTRACT

Provided is an antenna apparatus, the antenna apparatus comprising a first antenna unit, which is arranged at one end of a terminal device; and a second antenna unit, which is arranged at one end of the terminal device. The first antenna unit comprises a first side frame, a first built-in antenna, a first ground wire, and a first feed point, wherein a first end of the first side frame is connected to the first built-in antenna and the first ground wire, and a second end of the first side frame is provided with the first feed point; and the second antenna unit comprises a second side frame, a first switch, a second ground wire, a connecting wire, a second built-in antenna, a third built-in antenna, and a second feed point.

20 Claims, 6 Drawing Sheets

(56) References Cited

U.S. PATENT DOCUMENTS

| | | | |
|---|---|---|---|
| 11,011,837 B2 | 5/2021 | Wu et al. | |
| 2016/0233574 A1* | 8/2016 | Xiong | H01Q 1/2258 |
| 2018/0358699 A1 | 12/2018 | Li et al. | |

FOREIGN PATENT DOCUMENTS

| | | |
|---|---|---|
| CN | 106571788 | 4/2017 |
| CN | 107851884 | 3/2018 |
| CN | 108701889 | 10/2018 |
| CN | 109687105 | 4/2019 |
| EP | 3189559 | 12/2018 |
| WO | WO 2016/034887 | 3/2016 |

OTHER PUBLICATIONS

Notification of Office Action and Search Report dated Sep. 9, 2020 From the State Intellectual Property Office of the People's Republic of China Re. Application No. 201910898909.6 and Its Translation of Office Action Into English. (11 Pages).

International Search Report and the Written Opinion dated May 27, 2020 From the International Searching Authority Re. Application No. PCT/CN2019/119614 and Its Translation of Search Report Into English. (8 Pages).

* cited by examiner

ANTENNA APPARATUS

RELATED APPLICATIONS

This application is a National Phase of PCT Patent Application No. PCT/CN2019/119614 having International filing date of Nov. 20, 2019, which claims the benefit of priority of Chinese Patent Application No. 201910898909.6 filed on Sep. 23, 2019. The contents of the above applications are all incorporated by reference as if fully set forth herein in their entirety.

FIELD AND BACKGROUND OF THE INVENTION

The present disclosure relates to the field of communication technology, more particularly, to an antenna apparatus.

In recent years, 5G has become a hot topic, and the time for 5G to be officially commercialized is getting closer. As compared with 4G (that is, LTE), the biggest difference between 5G and 4G is that the transmission rate is greatly increased and the transmission delay is reduced to the millisecond level, which can bring a series of further development and maturity of 5G-related industries. For example, AR (augmented reality)/VR (virtual reality) can use 5G transmission instead of wired transmission, and is no longer restricted by space. The 5G communication between unmanned vehicles and the millisecond-level transmission delay make the vehicles safer to drive. The mobile live broadcast of TV media uses 5G transmission, which can ensure excellent image quality and real-time performance. The Internet of Things uses 5G transmission, which allows the networks to achieve high density and wide coverage. Telework, distance education, and telemedicine, especially when the location is not fixed and needs to be moved, 5G transmission is the best choice.

The antennas of 5G mobile phones can be divided into two types based on their frequencies, namely millimeter-wave antennas (20-60 GHz) and antennas below 6 GHz (Sub-6G for short).

Therefore, there is a need to provide an antenna apparatus that can support low frequency, intermediate frequency, high frequency, 3.x/4.x frequency band, Wi-Fi corresponding frequency band, etc., and can cover the frequency bands of mainstream operators around the world, which is also an important subject for relevant researchers and developers.

SUMMARY OF THE INVENTION

One objective of the present disclosure is to provide an antenna apparatus. Not only can the problem of the 5G communication technology that has not yet been disclosed in the related art be effectively resolved, but the low frequency, the intermediate frequency, the high frequency, the 3.x/4.x frequency band, the Wi-Fi corresponding frequency band, etc., can also be supported and the frequency bands of mainstream operators around the world can also be covered.

One aspect of the present disclosure provides an antenna apparatus. The antenna apparatus comprises a first antenna unit disposed at one end of the terminal device, a second antenna unit disposed at the one end of the terminal device, a third antenna unit disposed at the one end of the terminal device, a fourth antenna unit disposed at the one end of the terminal device, and a fifth antenna unit disposed at the one end of the terminal device. The first antenna unit comprises a first side bezel, a first built-in antenna, a first ground wire and a first feed point. A first end of the first side bezel is connected to the first built-in antenna and the first ground wire. A second end of the first side bezel is disposed with the first feed point. The second antenna unit comprises a second side bezel, a first switch, a second ground wire, a connecting wire, a second built-in antenna, a third built-in antenna and a second feed point. A first end of the second side bezel is connected to a first end of the first switch, and a second end of the second side bezel is connected to the second ground wire. The second side bezel is connected to the second feed point and the second built-in antenna through the connecting wire. A second end of the first switch is connected to the third built-in antenna. The third antenna unit comprises a fourth built-in antenna, a third feed point, a third ground wire, a fifth built-in antenna and a sixth built-in antenna. A first end of the fourth built-in antenna is disposed with the third feed point, a second end of the fourth built-in antenna is connected to the third ground wire, and the fourth built-in antenna is further connected to the fifth built-in antenna and the sixth built-in antenna. The fourth antenna unit comprises a third side bezel, a fourth feed point, a fourth ground wire and a seventh built-in antenna. A first end of the third side bezel is disposed with the fourth feed point, a second end of the third side bezel is connected to the fourth ground wire. The seventh built-in antenna is disposed on the third side bezel. The fifth antenna unit comprises a fourth side bezel, a fifth ground wire, an eighth built-in antenna, a sixth ground wire and a fifth feed point. The fourth side bezel is connected to the fifth ground wire, the fourth side bezel and the eighth built-in antenna are spaced apart from each other, a first end of the eighth built-in antenna is connected to the sixth ground wire, a second end of the eighth built-in antenna is disposed with the fifth feed point.

One aspect of the present disclosure provides an antenna apparatus. The antenna apparatus comprises a first antenna unit disposed at one end of the terminal device, and a second antenna unit disposed at the one end of the terminal device. The first antenna unit comprises a first side bezel, a first built-in antenna, a first ground wire and a first feed point. A first end of the first side bezel is connected to the first built-in antenna and the first ground wire. A second end of the first side bezel is disposed with the first feed point. The second antenna unit comprises a second side bezel, a first switch, a second ground wire, a connecting wire, a second built-in antenna, a third built-in antenna and a second feed point. A first end of the second side bezel is connected to a first end of the first switch, and a second end of the second side bezel is connected to the second ground wire. The second side bezel is connected to the second feed point and the second built-in antenna through the connecting wire. A second end of the first switch is connected to the third built-in antenna. The first antenna unit and the second antenna unit cover a plurality of frequency bands.

Furthermore, the antenna apparatus further comprises a third antenna unit disposed at the one end of the terminal device. The third antenna unit comprises a fourth built-in antenna, a third feed point, a third ground wire, a fifth built-in antenna and a sixth built-in antenna, a first end of the fourth built-in antenna is disposed with the third feed point, a second end of the fourth built-in antenna is connected to the third ground wire, and the fourth built-in antenna is further connected to the fifth built-in antenna and the sixth built-in antenna.

Furthermore, the antenna apparatus further comprises a fourth antenna unit disposed at the one end of the terminal device. The fourth antenna unit comprises a third side bezel, a fourth feed point, a fourth ground wire and a seventh built-in antenna, a first end of the third side bezel is disposed with the fourth feed point, a second end of the third side bezel is connected to the fourth ground wire, the seventh built-in antenna is disposed on the third side bezel.

Furthermore, the antenna apparatus further comprises a fifth antenna unit disposed at another end of the terminal device. The fifth antenna unit comprises a fourth side bezel, a fifth ground wire, an eighth built-in antenna, a sixth ground wire and a fifth feed point, wherein the fourth side bezel is connected to the fifth ground wire, the fourth side bezel and the eighth built-in antenna are spaced apart from each other, a first end of the eighth built-in antenna is connected to the sixth ground wire, a second end of the eighth built-in antenna is disposed with the fifth feed point.

Furthermore, the antenna apparatus further comprises a sixth antenna unit disposed at the another end of the terminal device. The sixth antenna unit comprises a fifth side bezel, a seventh ground wire, a sixth feed point, a second switch and a ninth built-in antenna, one end of the fifth side bezel is connected to the seventh ground wire, the sixth feed point and the second switch are disposed on the fifth side bezel, the ninth built-in antenna is disposed on the fifth side bezel.

Furthermore, the antenna apparatus further comprises a seventh antenna unit disposed at the another end of the terminal device. The seventh antenna unit comprises a sixth side bezel, an eighth ground wire, a seventh feed point, a tenth built-in antenna and an eleventh built-in antenna, a first end of the sixth side bezel is connected to the eighth ground wire, the seventh feed point is disposed on the sixth side bezel, a second end of the sixth side bezel is connected to the tenth built-in antenna, and the eleventh built-in antenna is disposed on the fifth side bezel.

Furthermore, the antenna apparatus further comprises a plurality of grooves arranged on a bezel of the terminal device.

Furthermore, the first switch has: a first switching state being a turn-off state; a second switching state, in which the first switch is grounded in parallel with a first preset value inductor; a third switching state, in which the first switch is grounded in parallel with a second preset value inductor; a fourth switching state, in which the first switch is grounded in parallel with a third preset value inductor; a fifth switching state, in which the first switch is grounded in parallel with a fourth preset value inductor; and a sixth switching state, in which the first switch is grounded in parallel with a fifth preset value inductor.

Furthermore, the second switch has: a seventh switching state being a turn-off state; an eighth switching state, in which the second switch is grounded in parallel with a sixth preset value inductor; and a ninth switching state, in which the second switch is grounded in parallel with a seventh preset value inductor.

Furthermore, a frequency band covered by the first antenna unit is at least one frequency band of 1710 MHz-2200 MHz, 2300 MHz-2700 MHz, 3.3 GHz-4.2 GHz, 4.4 GHz-5 GHz, 2400 MHz-2500 MHz and 5150 MHz-5850 MHz. A frequency band covered by the second antenna unit is at least one frequency band of 620 MHz-960 MHz, 1710 MHz-2200 MHz, 2300 MHz-2700 MHz, and 2400 MHz-2500 MHz. A frequency band covered by the third antenna unit is at least one frequency band of 3.3 GHz-4.2 GHz, 4.4 GHz-5 GHz and 5150 MHz-5850 MHz. A frequency covered by the fourth antenna unit is 1575 MHz.

Furthermore, a frequency band covered by the fifth antenna unit is at least one frequency band of 2300 MHz-2700 MHz, 3.3 GHz-4.2 GHz and 4.4 GHz-5 GHz. A frequency band covered by the sixth antenna unit is at least one frequency band of 620 MHz-960 MHz and 1710 MHz-2200 MHz. A frequency band covered by the seventh antenna unit is at least one frequency band of 1710 MHz-2200 MHz, 2300 MHz-2700 MHz, 3.3 GHz-4.2 GHz and 4.4 GHz-5 GHz.

The advantages of the present disclosure lie in that the antenna apparatus of the present disclosure can support low frequency (620 MHz-960 MHz) 2×2 MIMO (Multiple-Input Multiple-Output), intermediate frequency (1710 MHz-2200 MHz), high frequency (2300 MHz-2700 MHz), 3.x/4.x frequency band (3.3 GHz-4.2 GHz, 4.4 GHz-5 GHz) 4×4 MIMO, and Wi-Fi (2400 MHz-2500 MHz, 5150 MHz-5850 MHz) 2×2 MIMO, and covers the frequency bands of mainstream operators around the world. In addition, the space of the terminal device occupied by the antenna units is smaller. The maximum heights required by the antenna units disposed on the top of the terminal device and the antenna units disposed on the bottom of the terminal device are respectively 1.3 mm and 3 mm. 5 grooves are arranged on the terminal device so as to deploy 7 antenna units. After testing, the performances of the main antenna and diversity antenna of the antenna apparatus described in the present disclosure differ from the operator's requirements by 2 dB. The 4×4 MIMO performances of the intermediate frequency, high frequency and 3.x/4.x frequency band are 1-2 dB better than that of 2×2 MIMO. Additionally, the worst isolation between the antenna units ("isolation" refers to the degree of mutual interference between antenna unit and antenna unit) is −10 dB.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Figure 1:
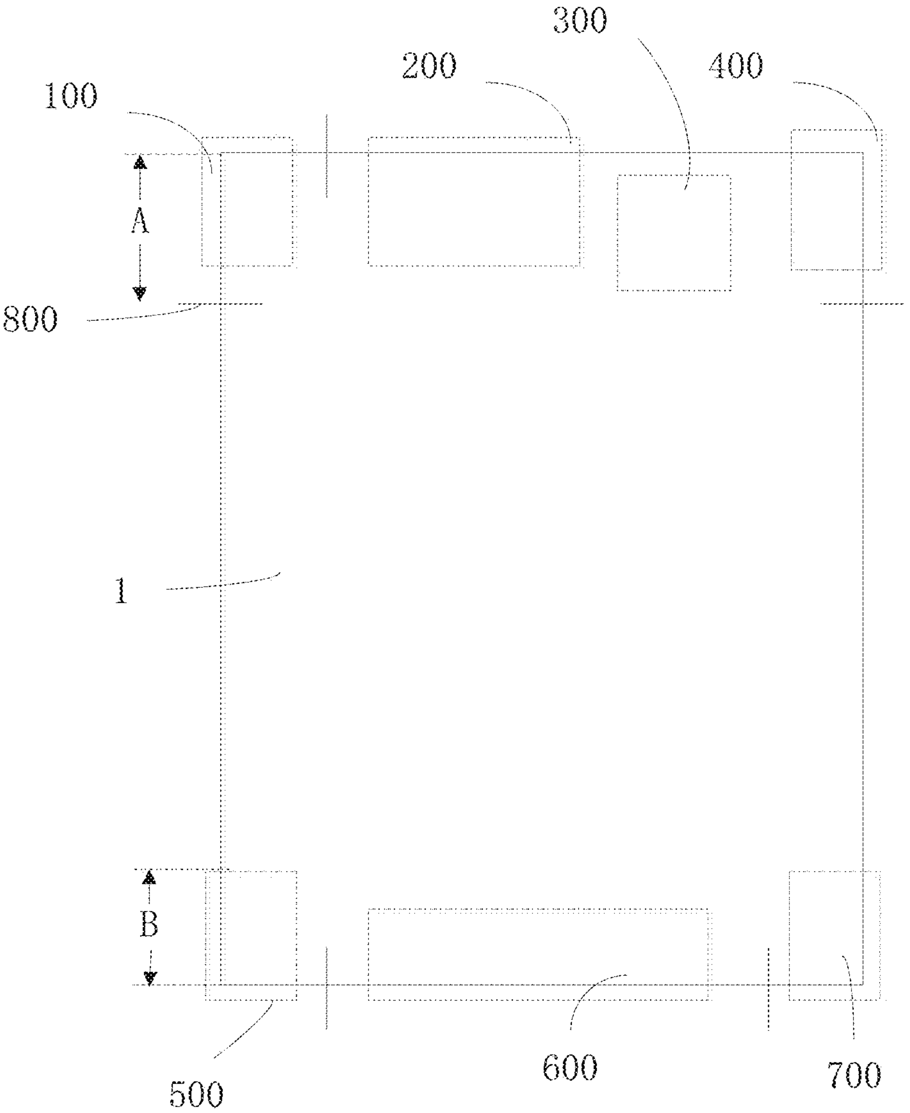
FIG. 1 is a schematic diagram of a structure of an antenna apparatus according to one embodiment of the present disclosure.

As shown in FIG. 1, FIG. 1 is a schematic diagram of a structure of an antenna apparatus according to one embodiment of the present disclosure. The antenna apparatus comprises a first antenna unit 100, a second antenna unit 200, a third antenna unit 300, a fourth antenna unit 400, a fifth antenna unit 500, a sixth antenna unit 600, a seventh antenna unit 700, and a plurality of grooves 800.

The frequency bands and ranges involved in the present disclosure are as follows: low frequency: 620 MHz-960 MHz, intermediate frequency: 1710 MHz-2200 MHz, high frequency: 2300 MHz-2700 MHz, 3.x/4.x frequency band: 3.3 GHz-4.2 GHz, 4.4 GHz-5 GHz, Wi-Fi 2.4G: 2400 MHz-2500 MHz (which is also the frequency range of Bluetooth), Wi-Fi 5G: 5150 MHz-5850 MHz, GPS: 1575 MHz.

The plurality of grooves 800 are arranged on a bezel of a terminal device 1. Not only is a side bezel of the terminal device 1 divided into a plurality of individual side bezels, but the mutual interferences between the antenna units can also be isolated.

In one embodiment of the present disclosure, maximum heights required by the antenna units disposed on a top of the terminal device 1 and the antenna units disposed on a bottom of the terminal device 1 are respectively 1.3 mm (as indicated by reference character A in FIG. 1) and 3 mm (as indicated by reference character B in FIG. 1).

A frequency band covered by the first antenna unit 100 is at least one frequency band of 1710 MHz-2200 MHz, 2300 MHz-2700 MHz, 3.3 GHz-4.2 GHz, 4.4 GHz-5 GHz, 2400 MHz-2500 MHz and 5150 MHz-5850 MHz. For example, the frequency bands covered by the first antenna unit 100 are 1710 MHz-2200 MHz and 2300 MHz-2700 MHz.

A frequency band covered by the second antenna unit 200 is at least one frequency band of 620 MHz-960 MHz, 1710 MHz-2200 MHz, 2300 MHz-2700 MHz, and 2400 MHz-2500 MHz. For example, the frequency bands covered by the second antenna unit 200 are 620 MHz-960 MHz and 1710 MHz-2200 MHz.

A frequency band covered by the third antenna unit 300 is at least one frequency band of 3.3 GHz-4.2 GHz, 4.4 GHz-5 GHz and 5150 MHz-5850 MHz. For example, the frequency bands covered by the third antenna unit 300 are 3.3 GHz-4.2 GHz and 4.4 GHz-5 GHz.

A frequency covered by the fourth antenna unit 400 is 1575 MHz.

A frequency band covered by the fifth antenna unit 500 is at least one frequency band of 2300 MHz-2700 MHz, 3.3 GHz-4.2 GHz and 4.4 GHz-5 GHz. For example, the frequency band covered by the fifth antenna unit 500 is 2300 MHz-2700 MHz.

A frequency band covered by the sixth antenna unit 600 is at least one frequency band of 620 MHz-960 MHz and 1710 MHz-2200 MHz. For example, the frequency band covered by the sixth antenna unit 600 is 620 MHz-960 MHz.

A frequency band covered by the seventh antenna unit 700 is at least one frequency band of 1710 MHz-2200 MHz, 2300 MHz-2700 MHz, 3.3 GHz-4.2 GHz and 4.4 GHz-5 GHz. For example, the frequency bands covered by the seventh antenna unit 700 are 1710 MHz-2200 MHz and 2300 MHz-2700 MHz.

Figure 2:
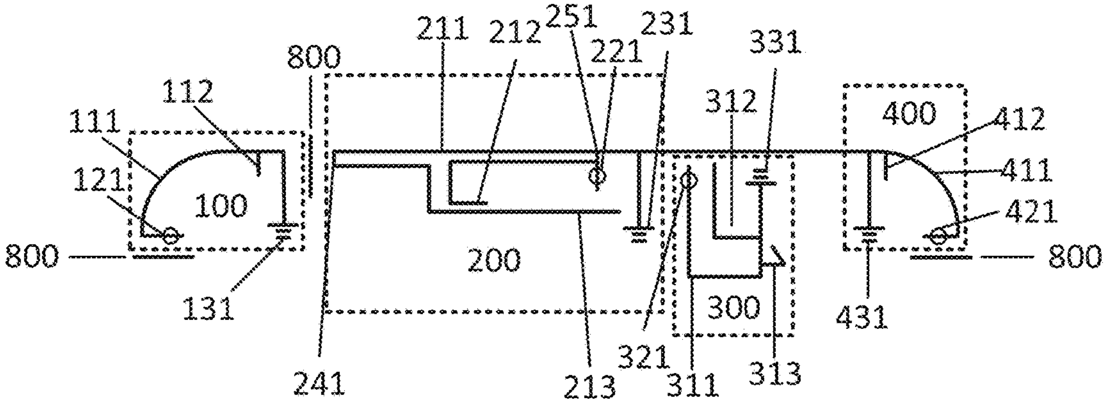
FIG. 2 is a schematic diagram of a top structure of an antenna apparatus according to one embodiment of the present disclosure.

In greater detail, the first antenna unit 100 is located on the top of the terminal device 1, as shown in FIG. 1. As shown in FIG. 2, the first antenna unit 100 comprises a first side bezel 111, a first built-in antenna 112, a first ground wire 131 and a first feed point 121. A first end of the first side bezel 111 is connected to the first built-in antenna 112 and the first ground wire 131, and a second end of the first side bezel 111 is provided with the first feed point 121.

The first antenna unit 100 covers these five frequency ranges: diversity intermediate frequency, diversity high frequency, diversity 3.x/4.x, first Wi-Fi 2.4G antenna, and second Wi-Fi 5G antenna. The first side bezel 111 is preferably used in a form of a loop antenna at the diversity ("diversity" refers to the first antenna) intermediate frequency, the diversity high frequency and the first Wi-Fi 2.4G antenna. The first build-in antenna 112 is used as the diversity 3.x/4.x and the second Wi-Fi 5G antenna.

Figure 4:
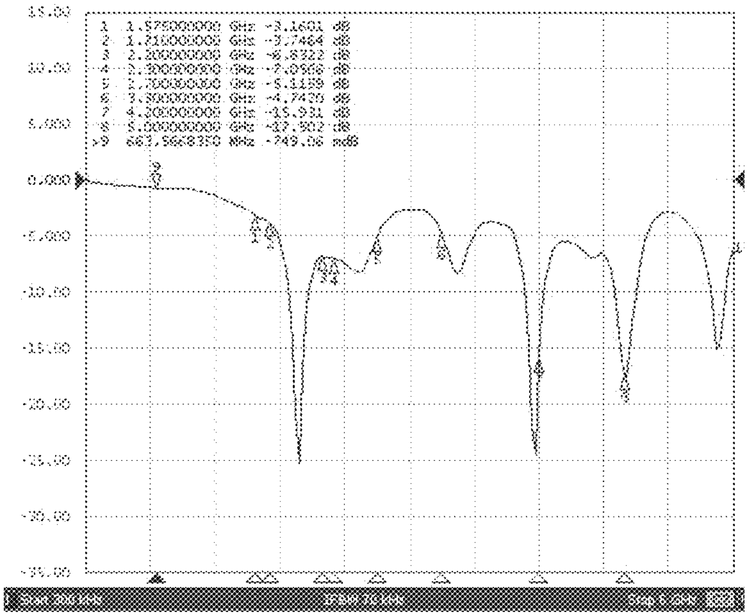
FIG. 4 is a schematic diagram of frequency bands supported by a first antenna unit according to one embodiment of the present disclosure.

As shown in FIG. 4, FIG. 4 is an S11 figure corresponding to the first antenna unit 100 that does not use a match circuit (that is, the schematic diagram of return loss, the abscissa in the figure represents frequency, and the ordinate represents return loss). As can be seen from the figure, the advantage of the design of the above first antenna unit 100 is that the free space efficiencies (return losses of different frequency bands) of various frequency bands of the first antenna unit 100 are respectively as follows: the diversity intermediate frequency is −7.8 dB, the diversity high frequency is −7.7 dB, the diversity 3.x/4.x is −9 dB, the first Wi-Fi 2.4G antenna is −7.2 dB, and the second Wi-Fi 5G antenna is −7.5 dB.

With additional reference to FIG. 1, the second antenna unit 200 is located on the top of the terminal device 1, and is disposed adjacent to the first antenna unit 100. As shown in FIG. 2, the second antenna unit 200 comprises a second side bezel 211, a first switch 241, a second ground wire 231, a connecting wire 251, a second built-in antenna 212, a third built-in antenna 213 and a second feed point 221. A first end of the second side bezel 211 is connected to a first end of the first switch 241, and a second end of the second side bezel 211 is connected to the second ground wire 231. The second side bezel 211 is connected to the second feed point 221 and the second built-in antenna 212 through the connecting wire 251. A second end of the first switch 241 is connected to the third built-in antenna 213.

The second antenna unit 200 covers diversity low frequency, MIMO ("MIMO" refers to more than two antennas) intermediate frequency, MIMO high frequency and second Wi-Fi 2.4G antenna. The second side bezel 211 and the third built-in antenna 213 are combined together, and form an inverted F antenna. This design can achieve the diversity low frequency, and at the same time resonances are generated at intermediate and high frequencies. The second built-in antenna 212 generates resonances at the intermediate and high frequencies.

In addition, the switch 241 shown in FIG. 2 has a first switching state, which is a turn-off state; a second switching state, in which it is grounded in parallel with a first preset value inductor; a third switching state, in which it is grounded in parallel with a second preset value inductor; a fourth switching state, in which it is grounded in parallel with a third preset value inductor; a fifth switching state, in which it is grounded in parallel with a fourth preset value inductor; and a sixth switching state, in which it is grounded in parallel with a fifth preset value inductor. The first switching state, the second switching state, the third switching state, the fourth switching state, the fifth switching state and the sixth switching state respectively cover 620 MHz-650 MHz, 720 MHz-760 MHz, 760 MHz-800 MHz, 790 MHz-820 MHz, 860 MHz-890 MHz and 920 MHz-960 MHz.

In one embodiment of the present disclosure, the diversity low frequency is formed by using the first switch 241 to switch to different states so as to achieve full coverage of the 620-960 MHz frequency band, and six switching states are divided. In the six switching states, when the first switch 241 is switched to the first switching state, it is in the turn-off state. When the first switch 241 is switched to the second switching state, a value of the first preset value inductor is 56 nanohenries. When the first switch 241 is switched to the third switching state, a value of the second preset value inductor is 33 nanohenries. When the first switch 241 is switched to the fourth switching state, a value of the third preset value inductor is 26 nanohenries. When the first switch 241 is switched to the fifth switching state, a value of the fourth preset value inductor is 18 nanohenries. When the first switch 241 is switched to the sixth switching state, a value of the fifth preset value inductor is 9.8 nanohenries.

Figure 5:
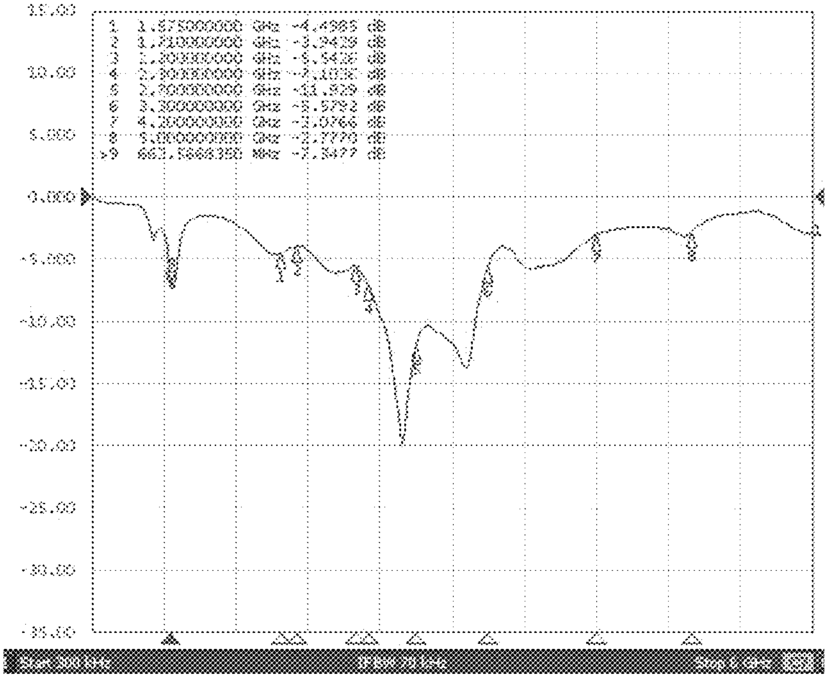
FIG. 5 is a schematic diagram of return loss of a second antenna unit according to one embodiment of the present disclosure.

As shown in FIG. 5, FIG. 5 is an S11 figure corresponding to the second antenna unit 200 when the first switch 241 is in the turn-off state. As can be seen from the figure, the advantage of the design of the above second antenna unit 200 is that the free space efficiencies of various frequency bands of the second antenna unit 200 are respectively as follows: the diversity low frequency is −12.2 dB, the MIMO intermediate frequency is −11.2 dB, the MIMO high frequency is −11.7 dB, and the second Wi-Fi 2.4G antenna is −12.4 dB.

With additional reference to FIG. 1, the third antenna unit 300 is located on the top of the terminal device 1, and is disposed adjacent to the second antenna unit 200. As shown in FIG. 2, the third antenna unit 300 comprises a fourth built-in antenna 311, a third feed point 321, a third ground wire 331, a fifth built-in antenna 312 and a sixth built-in antenna 313. A first end of the fourth built-in antenna 311 is disposed with the third feed point 321, a second end of the fourth built-in antenna 311 is connected to the third ground wire 331, and the fourth built-in antenna 311 is further connected to the fifth built-in antenna 312 and the sixth built-in antenna 313.

The third antenna unit 300 covers the first Wi-Fi 5G antenna and the MIMO 3.x/4.x antenna. The fourth built-in antenna 311 is preferably a loop antenna, and the fifth built-in antenna 312 and the sixth built-in antenna 313 are preferably parasitic antennas. This design can allow the fourth built-in antenna 311, the fifth built-in antenna 312 and the sixth built-in antenna 313 to work together, and generate resonances at 3 GHz-6 GHz.

Figure 6:
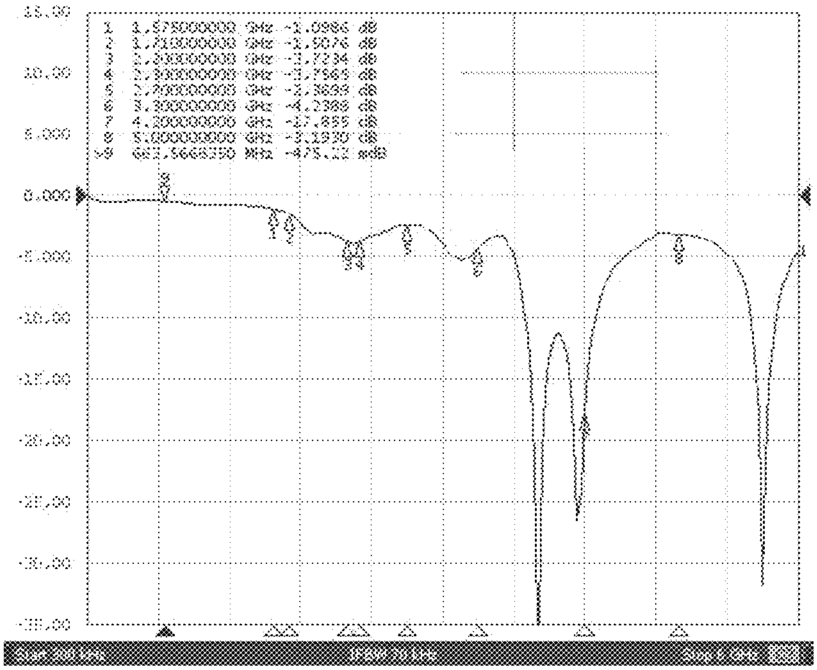
FIG. 6 is a schematic diagram of return loss of a third antenna unit according to one embodiment of the present disclosure.

As shown in FIG. 6, FIG. 6 is an S11 figure corresponding to the third antenna unit 300 that does not use a match circuit. As can be seen from the figure, the advantage of the design of the above third antenna unit 300 is that the free space efficiencies of various frequency bands of the third antenna unit 300 are respectively as follows: the first Wi-Fi 5G antenna is −6.4 dB, the MIMO 3.x/4.x antenna is 11.8 dB.

With additional reference to FIG. 1, the fourth antenna unit 400 is disposed on the top of the terminal device 1, and is disposed adjacent to the third antenna unit 300. As shown in FIG. 2, the fourth antenna unit 400 comprises a third side bezel 411, a fourth feed point 421, a fourth ground wire 431 and a seventh built-in antenna 412. A first end of the third side bezel 411 is disposed with the fourth feed point 421, a second end of the third side bezel 411 is connected to the fourth ground wire 431. Additionally, the seventh built-in antenna 412 is disposed on the third side bezel 411.

The fourth antenna unit 400 covers the GPS frequency band. Therefore, the third side bezel 411 is preferably a loop antenna, and the seventh built-in antenna 412 is preferably a parasitic antenna. With such a design, the third side bezel 411 and the seventh built-in antenna 412 work together, and generate resonance at 1575 MHz.

Figure 7:
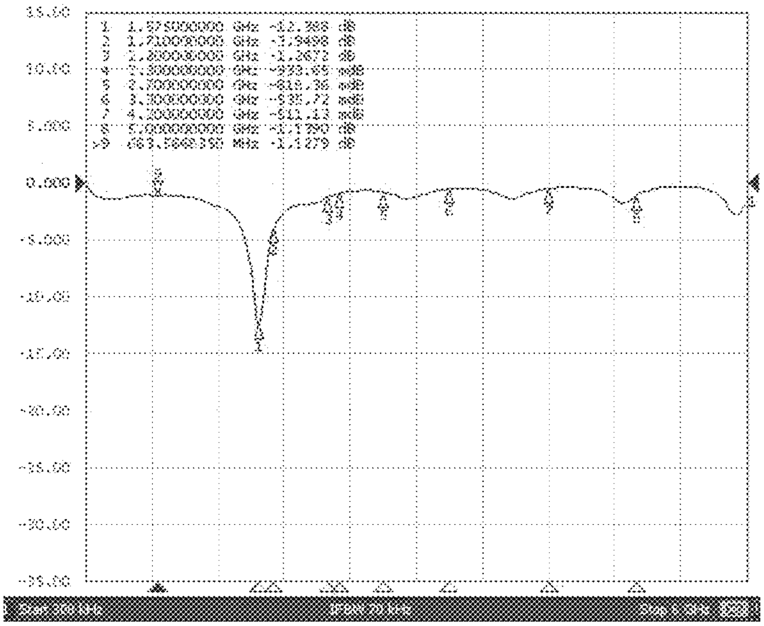
FIG. 7 is a schematic diagram of return loss of a fourth antenna unit according to one embodiment of the present disclosure.

As shown in FIG. 7, FIG. 7 is an S11 figure corresponding to the fourth antenna unit 400 that does not use a match circuit. As can be seen from the figure, the advantage of the design of the above fourth antenna unit 400 is that the free space efficiency of a single frequency band of the fourth antenna unit 400 is as follows: the GPS is −9.8 dB.

Figure 3:
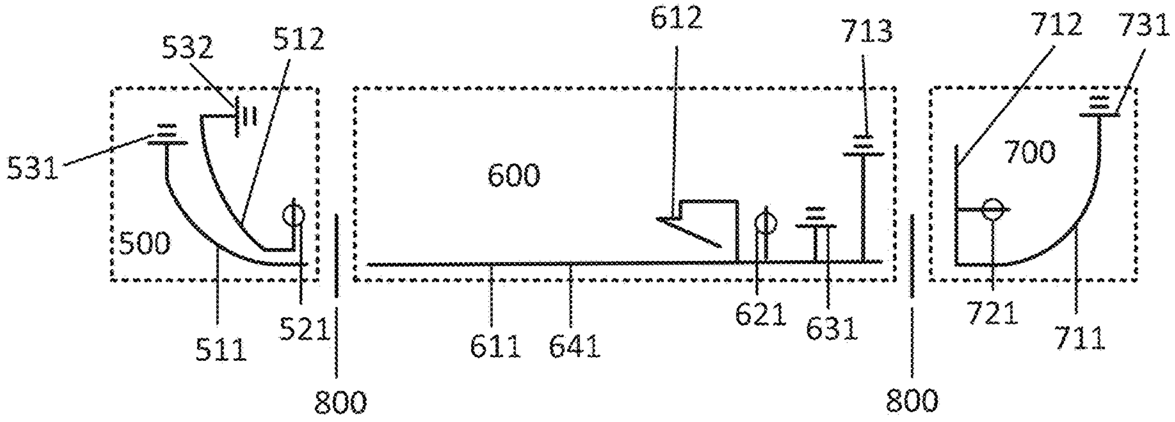
FIG. 3 is a schematic diagram of a bottom structure of an antenna apparatus according to one embodiment of the present disclosure.

With additional reference to FIG. 1, the fifth antenna unit 500 is located on the bottom of the terminal device 1. As shown in FIG. 3, the fifth antenna unit 500 comprises a fourth side bezel 511, a fifth ground wire 531, an eighth built-in antenna 512, a sixth ground wire 532 and a fifth feed point 521. The fourth side bezel 511 is connected to the fifth ground wire 531. A first end of the eighth built-in antenna 512 is connected to the sixth ground wire 532, a second end of the eighth built-in antenna 512 is disposed with the fifth feed point 521, and the eighth built-in antenna 512 and the fourth side bezel 511 are spaced apart from each other.

The fifth antenna unit 500 covers the MIMO high frequency and the main ("main" refers to the second antenna) 3.x/4.x. The eighth built-in antenna 512 is preferably a loop antenna. The fifth antenna unit 500 is coupled to the fourth side bezel 511 through the built-in loop antenna, so as to be able to generate resonances at the high frequency band and the 3.x/4.x frequency band.

Figure 8:
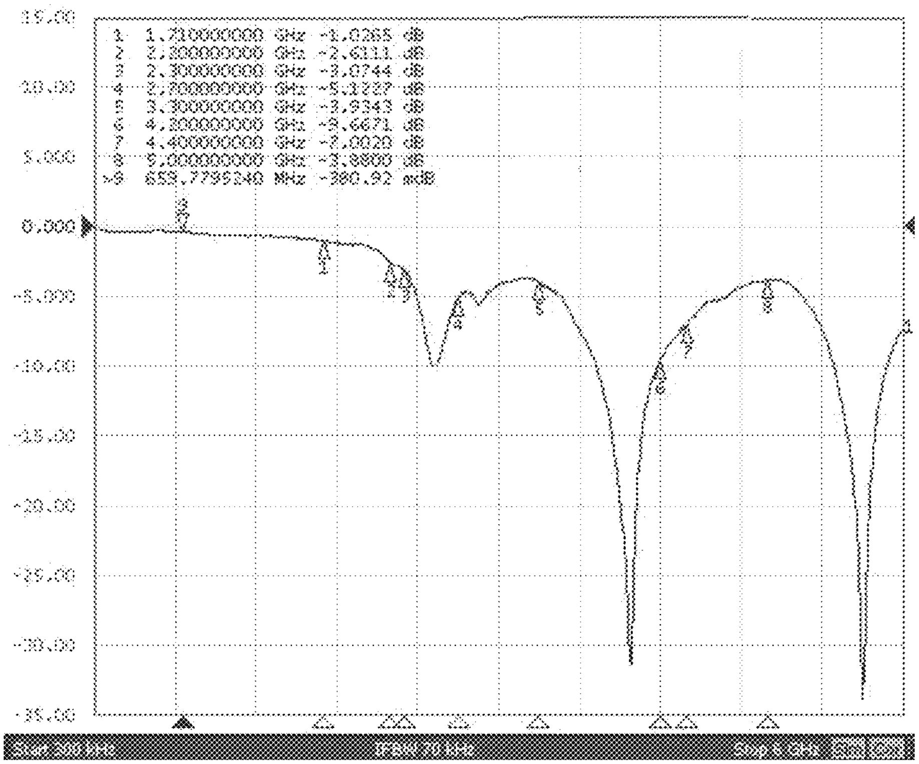
FIG. 8 is a schematic diagram of return loss of a fifth antenna unit according to one embodiment of the present disclosure.

As shown in FIG. 8, FIG. 8 is an S11 figure corresponding to the fifth antenna unit 500 that does not use a match circuit. As can be seen from the figure, the advantage of the design of the above fifth antenna unit 500 is that the free space efficiencies of various frequency bands of the fifth antenna unit 500 are respectively as follows: the MIMO high frequency is −10.8 dB, the main 3.x/4.x is −8.3 dB.

With additional reference to FIG. 1, the sixth antenna unit 600 is located on the bottom of the terminal device 1, and is disposed adjacent to the fifth antenna unit 500. As shown in FIG. 3, the sixth antenna unit 600 comprises a fifth side bezel 611, a seventh ground wire 631, a sixth feed point 621, a second switch 641 and a ninth built-in antenna 612. One end of the fifth side bezel 611 is connected to the seventh ground wire 631. The sixth feed point 621 and the second switch 641 are disposed on the fifth side bezel 611. The ninth built-in antenna 612 is disposed on the fifth side bezel 611.

The sixth antenna unit 600 covers main low frequency and main intermediate frequency. The fifth side bezel 611 is preferably used in a form of an inverted F antenna at the low frequency. The ninth built-in antenna 612 is also in the form of the inverted F antenna. This design can allow the fifth side bezel 611 and the ninth built-in antenna 612 to work together, and generate resonance at the intermediate frequency.

In addition to that, the second switch 641 shown in FIG. 3 has a seventh switching state, which is a turn-off state; an eighth switching state, in which it is grounded in parallel with a sixth preset value inductor; and a ninth switching state, in which it is grounded in parallel with a seventh preset value inductor. The seventh switching state, the eighth switching state and the ninth switching state respectively cover 620 MHz-700 MHz, 700 MHz-800 MHz and 790 MHz-960 MHz.

In one embodiment of the present disclosure, when the second switch 641 is switched to the seventh switching state, it is in the turn-off state. When the second switch 641 is switched to the eighth switching state, a value of the sixth preset value inductor is 56 nanohenries. When the second switch 641 is switched to the ninth switching state, a value of the seventh preset value inductor is 15 nanohenries.

Figure 9:
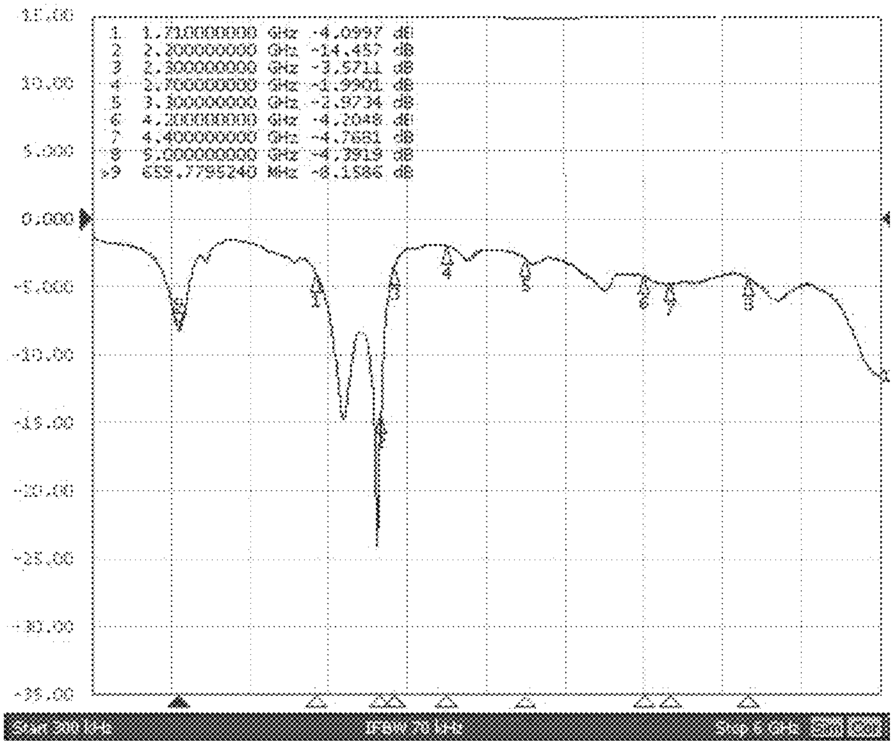
FIG. 9 is a schematic diagram of return loss of a sixth antenna unit according to one embodiment of the present disclosure.

As shown in FIG. 9, FIG. 9 is an S11 figure corresponding to the sixth antenna unit 600 that does not use a match circuit. As can be seen from the figure, the advantage of the design of the above sixth antenna unit 600 is that the free space efficiencies of various frequency bands of the sixth antenna unit 600 are respectively as follows: the main low frequency is −9 dB, the main intermediate frequency is −4.9 dB.

With additional reference to FIG. 1, the seventh antenna unit 700 is disposed on the bottom of the terminal device 1, and is disposed adjacent to the sixth antenna unit 600. As shown in FIG. 3, the seventh antenna unit 700 comprises a sixth side bezel 711, an eighth ground wire 731, a seventh feed point 721, a tenth built-in antenna 712 and an eleventh built-in antenna 713. A first end of the sixth side bezel 711 is connected to the eighth ground wire 731. The seventh feed point 721 is disposed on the sixth side bezel 711. A second end of the sixth side bezel 711 is connected to the tenth built-in antenna 712. In addition, the eleventh built-in antenna 713 is disposed on the fifth side bezel 611.

The seventh antenna unit 700 covers the main high frequency, the MIMO intermediate frequency and the MIMO 3.x/4.x. The sixth side bezel 711 is preferably used in a form of a loop antenna at the main high frequency, and at the same time there is resonance at the intermediate frequency. Additionally, since the eleventh built-in antenna 713 is disposed on the fifth side bezel 611, the tenth built-in antenna 712 and the eleventh built-in antenna 713 can generate resonance at the 3.x/4.x frequency band through coupling the ground wires.

Figure 10:
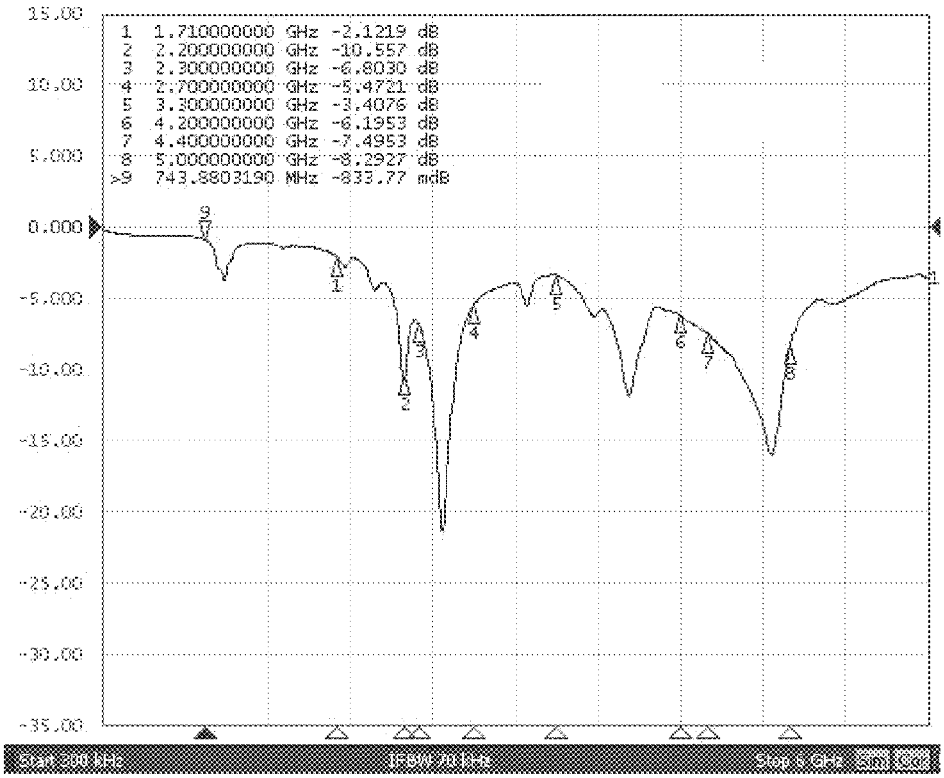
FIG. 10 is a schematic diagram of return loss of a seventh antenna unit according to one embodiment of the present disclosure.

As shown in FIG. 10, FIG. 10 is an S11 figure corresponding to the seventh antenna unit 700 that does not use a match circuit. As can be seen from the figure, the advantage of the design of the above seventh antenna unit 700 is that the free space efficiencies of various frequency bands of the seventh antenna unit 700 are respectively as follows: the main high frequency is −5.5 dB, the MIMO intermediate frequency is −11.6 dB, and the MIMO 3.x/4.x is −9 db.

The larger the spacing distance between the antenna units is, the smaller the mutual interference between the antenna units is. However, due to the limitation of the size of the terminal device, the spacing distance cannot be expanded indefinitely. Hence, through the above design, the worst isolation between the fifth antenna unit 500 and the sixth antenna unit 600 is −10 dB, the worst isolation between the fifth antenna unit 500 and the seventh antenna unit 700 is −12 dB, the worst isolation between the sixth antenna unit 600 and the seventh antenna unit 700 is −10 dB. The worst isolation among the isolations between each two of the fifth antenna unit 500, the sixth antenna unit 600 and the seventh antenna unit 700 is −10 dB. In this manner, the isolation of the three antenna units (that is, the antenna units disposed on the bottom of the terminal device) is better.

Similarly, the worst isolation between the first antenna unit 100 and the second antenna unit 200 is −11 dB, the worst isolation between the first antenna unit 100 and the third antenna unit 300 is −24 dB, the worst isolation between the first antenna unit 100 and the fourth antenna unit 400 is −26 dB, the worst isolation between the second antenna unit 200 and the third antenna unit 300 is −10 dB, the worst isolation between the second antenna unit 200 and the fourth antenna unit 400 is −17 dB, the worst isolation between the third antenna unit 300 and the fourth antenna unit 400 is −32 dB. With such a design, the worst isolation among the isolations between each two of the four antennas, the first antenna unit 100, the second antenna unit 200, the third antenna unit 300 and the fourth antenna unit 400, is −10 dB. As a result, the isolation of the four antenna units (that is, the antenna units disposed on the top of the terminal device) is better.

The advantages of the present disclosure lie in that the antenna apparatus of the present disclosure can support low frequency (620 MHz-960 MHz) 2×2 MIMO (Multiple-Input Multiple-Output), intermediate frequency (1710 MHz-2200 MHz), high frequency (2300 MHz-2700 MHz), 3.x/4.x frequency band (3.3 GHz-4.2 GHz, 4.4 GHz-5 GHz) 4×4 MIMO, and Wi-Fi (2400 MHz-2500 MHz, 5150 MHz-5850 MHz) 2×2 MIMO, and covers the frequency bands of mainstream operators around the world. In addition, the space of the terminal device occupied by the antenna units is smaller. The maximum heights required by the antenna units disposed on the top of the terminal device and the antenna units disposed on the bottom of the terminal device are respectively 1.3 mm and 3 mm. 5 grooves are arranged on the terminal device so as to deploy 7 antenna units. After testing, the performances of the main antenna and diversity antenna of the antenna apparatus described in the present disclosure differ from the operator's requirements by 2 dB. The 4×4 MIMO performances of the intermediate frequency, high frequency and 3.x/4.x frequency band are 1-2 dB better than that of 2×2 MIMO. Additionally, the worst isolation between the antenna units ("isolation" refers to the degree of mutual interference between antenna unit and antenna unit) is −10 dB.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An antenna apparatus adapted for a terminal device, the antenna apparatus comprising:

a first antenna unit disposed at one end of the terminal device; and a second antenna unit disposed at the one end of the terminal device;

a third antenna unit disposed at the one end of the terminal device;

a fourth antenna unit disposed at the one end of the terminal device;

a fifth antenna unit disposed at the one end of the terminal device;

the first antenna unit comprising a first side bezel, a first built-in antenna, a first ground wire and a first feed point, wherein a first end of the first side bezel is connected to the first built-in antenna and the first ground wire, and a second end of the first side bezel is disposed with the first feed point;

the second antenna unit comprising a second side bezel, a first switch, a second ground wire, a connecting wire, a second built-in antenna, a third built-in antenna and a second feed point, wherein a first end of the second side bezel is connected to a first end of the first switch, and a second end of the second side bezel is connected to the second ground wire, the second side bezel is connected to the second feed point and the second built-in antenna through the connecting wire, a second end of the first switch is connected to the third built-in antenna;

wherein the third antenna unit comprises a fourth built-in antenna, a third feed point, a third ground wire, a fifth built-in antenna and a sixth built-in antenna, a first end of the fourth built-in antenna is disposed with the third feed point, a second end of the fourth built-in antenna is connected to the third ground wire, and the fourth built-in antenna is further connected to the fifth built-in antenna and the sixth built-in antenna;

wherein the fourth antenna unit comprises a third side bezel, a fourth feed point, a fourth ground wire and a seventh built-in antenna, a first end of the third side bezel is disposed with the fourth feed point, a second end of the third side bezel is connected to the fourth ground wire, the seventh built-in antenna is disposed on the third side bezel;

wherein the fifth antenna unit comprises a fourth side bezel, a fifth ground wire, an eighth built-in antenna, a sixth ground wire and a fifth feed point, wherein the fourth side bezel is connected to the fifth ground wire, the fourth side bezel and the eighth built-in antenna are spaced apart from each other, a first end of the eighth built-in antenna is connected to the sixth ground wire, a second end of the eighth built-in antenna is disposed with the fifth feed point.

2. An antenna apparatus adapted for a terminal device, the antenna apparatus comprising:

a first antenna unit disposed at one end of the terminal device; and a second antenna unit disposed at the one end of the terminal device;

the first antenna unit comprising a first side bezel, a first built-in antenna, a first ground wire and a first feed point, wherein a first end of the first side bezel is connected to the first built-in antenna and the first ground wire, and a second end of the first side bezel is disposed with the first feed point;

the second antenna unit comprising a second side bezel, a first switch, a second ground wire, a connecting wire, a second built-in antenna, a third built-in antenna and a second feed point, wherein a first end of the second side bezel is connected to a first end of the first switch, and a second end of the second side bezel is connected to the second ground wire, the second side bezel is connected to the second feed point and the second built-in antenna through the connecting wire, a second end of the first switch is connected to the third built-in antenna;

wherein the first antenna unit and the second antenna unit cover a plurality of frequency bands.

3. The antenna apparatus as claimed in claim 2, further comprising:

a third antenna unit disposed at the one end of the terminal device;

wherein the third antenna unit comprises a fourth built-in antenna, a third feed point, a third ground wire, a fifth built-in antenna and a sixth built-in antenna, a first end of the fourth built-in antenna is disposed with the third feed point, a second end of the fourth built-in antenna is connected to the third ground wire, and the fourth built-in antenna is further connected to the fifth built-in antenna and the sixth built-in antenna.

4. The antenna apparatus as claimed in claim 3, further comprising:

a fourth antenna unit disposed at the one end of the terminal device;

wherein the fourth antenna unit comprises a third side bezel, a fourth feed point, a fourth ground wire and a seventh built-in antenna, a first end of the third side bezel is disposed with the fourth feed point, a second end of the third side bezel is connected to the fourth ground wire, the seventh built-in antenna is disposed on the third side bezel.

5. The antenna apparatus as claimed in claim 4, wherein a frequency band covered by the first antenna unit is at least one frequency band of 1710 MHz-2200 MHz, 2300 MHz-2700 MHz, 3.3 GHz-4.2 GHz, 4.4 GHz-5 GHz, 2400 MHz-2500 MHz and 5150 MHz-5850 MHz;

a frequency band covered by the second antenna unit is at least one frequency band of 620 MHz-960 MHz, 1710 MHz-2200 MHz, 2300 MHz-2700 MHz, and 2400 MHz-2500 MHz;

a frequency band covered by the third antenna unit is at least one frequency band of 3.3 GHz-4.2 GHz, 4.4 GHz-5 GHz and 5150 MHz-5850 MHz;

a frequency covered by the fourth antenna unit is 1575 MHz.

6. The antenna apparatus as claimed in claim 2, further comprising:

a fifth antenna unit disposed at another end of the terminal device;

wherein the fifth antenna unit comprises a fourth side bezel, a fifth ground wire, an eighth built-in antenna, a sixth ground wire and a fifth feed point, wherein the fourth side bezel is connected to the fifth ground wire, the fourth side bezel and the eighth built-in antenna are spaced apart from each other, a first end of the eighth built-in antenna is connected to the sixth ground wire, a second end of the eighth built-in antenna is disposed with the fifth feed point.

7. The antenna apparatus as claimed in claim 6, wherein the antenna apparatus further comprises:

a sixth antenna unit disposed at the another end of the terminal device;

wherein the sixth antenna unit comprises a fifth side bezel, a seventh ground wire, a sixth feed point, a second switch and a ninth built-in antenna, one end of the fifth side bezel is connected to the seventh ground wire, the sixth feed point and the second switch are disposed on the fifth side bezel, the ninth built-in antenna is disposed on the fifth side bezel.

8. The antenna apparatus as claimed in claim 7, further comprising:

a seventh antenna unit disposed at the another end of the terminal device;

wherein the seventh antenna unit comprises a sixth side bezel, an eighth ground wire, a seventh feed point, a tenth built-in antenna and an eleventh built-in antenna, a first end of the sixth side bezel is connected to the eighth ground wire, the seventh feed point is disposed on the sixth side bezel, a second end of the sixth side bezel is connected to the tenth built-in antenna, and the eleventh built-in antenna is disposed on the fifth side bezel.

9. The antenna apparatus as claimed in claim 8, wherein a frequency band covered by the fifth antenna unit is at least one frequency band of 2300 MHz-2700 MHz, 3.3 GHz-4.2 GHz and 4.4 GHz-5 GHz;

a frequency band covered by the sixth antenna unit is at least one frequency band of 620 MHz-960 MHz and 1710 MHz-2200 MHz;

a frequency band covered by the seventh antenna unit is at least one frequency band of 1710 MHz-2200 MHz, 2300 MHz-2700 MHz, 3.3 GHz-4.2 GHz and 4.4 GHz-5 GHz.

10. The antenna apparatus as claimed in claim 7, wherein the second switch has:

a seventh switching state being a turn-off state;

an eighth switching state, in which the second switch is grounded in parallel with a sixth preset value inductor; and a ninth switching state, in which the second switch is grounded in parallel with a seventh preset value inductor.

11. The antenna apparatus as claimed in claim 2, further comprising a plurality of grooves, the plurality of grooves being arranged on a bezel of the terminal device.

12. The antenna apparatus as claimed in claim 2, wherein the first switch has:

a first switching state being a turn-off state;

a second switching state, in which the first switch is grounded in parallel with a first preset value inductor;

a third switching state, in which the first switch is grounded in parallel with a second preset value inductor;

a fourth switching state, in which the first switch is grounded in parallel with a third preset value inductor;

a fifth switching state, in which the first switch is grounded in parallel with a fourth preset value inductor; and a sixth switching state, in which the first switch is grounded in parallel with a fifth preset value inductor.

13. A terminal device, comprising an antenna apparatus, the antenna apparatus comprising:

a first antenna unit disposed at one end of the terminal device; and a second antenna unit disposed at the one end of the terminal device;

the first antenna unit comprising a first side bezel, a first built-in antenna, a first ground wire and a first feed point, wherein a first end of the first side bezel is connected to the first built-in antenna and the first ground wire, and a second end of the first side bezel is disposed with the first feed point;

the second antenna unit comprising a second side bezel, a first switch, a second ground wire, a connecting wire, a second built-in antenna, a third built-in antenna and a second feed point, wherein a first end of the second side bezel is connected to a first end of the first switch, and a second end of the second side bezel is connected to the second ground wire, the second side bezel is connected to the second feed point and the second built-in antenna through the connecting wire, a second end of the first switch is connected to the third built-in antenna;

wherein the first antenna unit and the second antenna unit cover a plurality of frequency bands.

14. The terminal device as claimed in claim 13, wherein the antenna apparatus further comprises:

a third antenna unit disposed at the one end of the terminal device;

wherein the third antenna unit comprises a fourth built-in antenna, a third feed point, a third ground wire, a fifth built-in antenna and a sixth built-in antenna, a first end of the fourth built-in antenna is disposed with the third feed point, a second end of the fourth built-in antenna is connected to the third ground wire, and the fourth built-in antenna is further connected to the fifth built-in antenna and the sixth built-in antenna.

15. The terminal device as claimed in claim 14, wherein the antenna apparatus further comprises:

a fourth antenna unit disposed at the one end of the terminal device;

wherein the fourth antenna unit comprises a third side bezel, a fourth feed point, a fourth ground wire and a seventh built-in antenna, a first end of the third side bezel is disposed with the fourth feed point, a second end of the third side bezel is connected to the fourth ground wire, the seventh built-in antenna is disposed on the third side bezel.

16. The terminal device as claimed in claim 13, wherein the antenna apparatus further comprises:

a fifth antenna unit disposed at another end of the terminal device;

wherein the fifth antenna unit comprises a fourth side bezel, a fifth ground wire, an eighth built-in antenna, a sixth ground wire and a fifth feed point, wherein the fourth side bezel is connected to the fifth ground wire, the fourth side bezel and the eighth built-in antenna are spaced apart from each other, a first end of the eighth built-in antenna is connected to the sixth ground wire, a second end of the eighth built-in antenna is disposed with the fifth feed point.

17. The terminal device as claimed in claim 13, wherein the antenna apparatus further comprises:

a sixth antenna unit disposed at the another end of the terminal device;

wherein the sixth antenna unit comprises a fifth side bezel, a seventh ground wire, a sixth feed point, a second switch and a ninth built-in antenna, one end of the fifth side bezel is connected to the seventh ground wire, the sixth feed point and the second switch are disposed on the fifth side bezel, the ninth built-in antenna is disposed on the fifth side bezel.

18. The terminal device as claimed in claim 17, wherein the antenna apparatus further comprises:

a seventh antenna unit disposed at the another end of the terminal device;

wherein the seventh antenna unit comprises a sixth side bezel, an eighth ground wire, a seventh feed point, a tenth built-in antenna and an eleventh built-in antenna, a first end of the sixth side bezel is connected to the eighth ground wire, the seventh feed point is disposed on the sixth side bezel, a second end of the sixth side bezel is connected to the tenth built-in antenna, and the eleventh built-in antenna is disposed on the fifth side bezel.

19. The terminal device as claimed in claim 13, wherein the antenna apparatus further comprises a plurality of groove arranged on a bezel of the terminal device.

20. The terminal device as claimed in claim 13, wherein the first switch has:

a first switching state being a turn-off state;

a second switching state, in which the first switch is grounded in parallel with a first preset value inductor;

a third switching state, in which the first switch is grounded in parallel with a second preset value inductor;

a fourth switching state, in which the first switch is grounded in parallel with a third preset value inductor;

a fifth switching state, in which the first switch is grounded in parallel with a fourth preset value inductor; and a sixth switching state, in which the first switch is grounded in parallel with a fifth preset value inductor.

* * * * *